United States Patent [19]

Takeuchi et al.

[11] Patent Number: 5,087,501

[45] Date of Patent: Feb. 11, 1992

[54] MAGNETIC RECORDING MEDIUM

[75] Inventors: Hajime Takeuchi; Yuji Koguchi, both of Yokohama, Japan

[73] Assignee: Kabushiki Kaisha Toshiba, Kanagawa, Japan

[21] Appl. No.: 213,707

[22] Filed: Jun. 28, 1988

[30] Foreign Application Priority Data

Jun. 30, 1987 [JP] Japan .................................. 62-163146

[51] Int. Cl.$^5$ .............................................. G11B 23/00
[52] U.S. Cl. .................................... 428/141; 428/336; 428/694; 428/900
[58] Field of Search ................. 428/694, 900, 336, 141

[56] References Cited

U.S. PATENT DOCUMENTS

| | | | |
|---|---|---|---|
| 4,450,199 | 5/1984 | Tadokoro et al. | 428/694 |
| 4,486,496 | 12/1984 | Dezawa et al. | 428/694 |
| 4,720,411 | 1/1988 | Shimozawa et al. | 428/694 |
| 4,780,366 | 10/1988 | Nishimatsu et al. | 428/694 |

FOREIGN PATENT DOCUMENTS

| | | |
|---|---|---|
| 0185112 | 12/1984 | European Pat. Off. . |
| 0175339 | 9/1985 | European Pat. Off. . |
| 0244868 | 5/1987 | European Pat. Off. . |

*Primary Examiner*—Paul J. Thibodeau
*Attorney, Agent, or Firm*—Finnegan, Henderson, Farabow, Garrett, and Dunner

[57] ABSTRACT

A magnetic recording medium is disclosed which is produced by applying to a non-magnetic substrate a magnetic coating material containing a ferromagnetic powder and a resinous binder. The coating formed of the magnetic coating material exhibits a deformation ratio (in the direction perpendicular to the film surface from the magnetic layer side) is not more than $1 \times 10^{-2}$ $\mu m^3$/mgf. This magnetic recording medium possesses a high surface accuracy, retains a highly desirable runnability for a long period of time, and excels in durability.

7 Claims, No Drawings

MAGNETIC RECORDING MEDIUM

The present application claims priority of Japanese Patent Application No. 62-163146 filed on June 30, 1987.

FIELD OF THE INVENTION AND RELATED ART STATEMENT

This invention relates to a magnetic recording medium, and more particularly to a magnetic recording medium capable of high-density recording and excellent in runnability and durability.

Generally, the magnetic recording medium is produced by applying a magnetic coating material containing a ferromagnetic powder and a resinous binder on a non-magnetic substrate such as of polyester thereby forming a magnetic layer thereon. Recording and reproducing is done while head is in sliding contact with the magnetic recording medium.

The state or degree of sliding contact between head and magnetic recording layer is different due to various application. In the case of a floppy disc drive, an audio deck, or a video deck, for example, the recording or replay is carried out with the state of sliding contact so adjusted that the dynamic frictional coefficient will fall approximately in the range of 0.04 to 0.4.

Recently, the promotion of OA and FA activities is gathering momentum. As a natural consequence, the demand for magnetic recording media, particularly those capable of high-density recording, is steadily growing in enthusiasm.

For realization of the high-density recording system from the standpoint of the magnetic recording medium, the improvement of magnetostatic properties, the enhancement of surface quality of the magnetic layer, etc. are believed to be effective measures. Then, for realization of highly desirable output and frequency properties, the enhancement of surface quality particularly of the magnetic layer constitutes itself an essential requirement.

In contrast, for realization of the high-density recording system from the standpoint of design of the deck, it is necessary to pay due consideration to the shape of the head and the magnetic property of the head and pay due respect to the stability of contact between the head and the recording medium. In the case of a floppy disc drive, for example, studies must be given to the shape of the slider and to the gimbal, the penetration, the head load, etc. as well. When the state of contact between the head and the recording medium is improved, the contact pressure is necessarily enhanced. As a result, the improvement of stable runnability and durability is required in addition to the improvement of magnetostatic property and surface property from the standpoint of the magnetic recording medium. Particularly in the case of a floppy disc medium, the reliability expected thereof is so exacting that the medium is rated as commercially valueless unless it exhibits durability enough to withstand not less than ten million passes of continuous sliding contact with one and the same track.

When the magnetic recording medium which has the surface quality thereof improved over the heretofore attainable level so much as to permit high-density recording was tested for durability and runnability with the aforementioned floppy disc drive, it was found to lose stability of runnability in one and the same track and durability with the elapse of the traveling time. To be more specific, when the head was caused to travel on the magnetic layer of the magnetic medium for a stated length of time, there was observed a phenomenon that the replay output could not be generated as required because the dynamic frictional coefficient between the head and the medium suddenly increased and the posture of the gimbal side head was impaired. When the surface of the magnetic recording medium was visually examined after the sudden increase of the dynamic frictional coefficient, it was found to have sustained scars of sliding on the test track.

For solution of this problem, various studies were made with various lubricants in search of a method capable of curbing the abrupt increase of the dynamic frictional coefficient. It was consequently found that a mere change in the kind and quantity of lubricant could not sufficiently prevent the sudden change in the dynamic frictional coefficient with the elapse of the traveling time.

Japanese Patent Disclosure SHO 60(1985)-111325 discloses an invention relating to a magnetic recording medium which has such qualities relating to a magnetic recording medium which has such qualities thereof as wear resistance, durability, ability to preclude particle falling, and tackiness improved by using as a resinous binder for the magnetic layer thereof a mixed resin consisting of two kinds of polyurethane resin different in tensile strength and elongation at fracture, a cellulosic resin, and a vinyl chloride type copolymer.

In the specification of Japanese Patent Application Disclosure SHO 60(1985)-111325, however, a technique for improving the surface quality of the magnetic recording medium and, at the same time, preventing degradation of durability and runnability for the purpose of imparting enhanced recording density to the magnetic recording medium is disclosed nowhere.

OBJECT AND SUMMARY OF THE INVENTION

A major object of the present invention, therefore, is to provide a magnetic recording medium possessing a highly desirable surface accuracy and enjoying improvement in durability and runnability.

Another object of this invention is to provide a magnetic recording medium capable of high-density recording and excellent in runnability and durability.

The other objects of this invention will become apparent from the following description of this invention.

The objects of this invention described above are accomplished by a magnetic recording medium which is produced by applying to a substrate a magnetic coating material containing a ferromagnetic powder and a resinous binder and whose magnetic layer formed of the magnetic coating material possesses a deformation ratio (exhibited under a load applied perpendicularly to the film surface on the magnetic layer side) not more than $1 \times 10^{-2}$ $\mu m^3$/mgf, preferably in the range of $1 \times 10^{-2}$ to $1 \times 10^{-6}$ $\mu m^3$/mgf.

The deformation ratio as reported in the present invention is measured with a probe type micro-displacement as follows. Otherwise, the deformation ratio may be measured with a commercially available surface roughness meter in the place of the micro-displacement detector.

To measure the deformation ratio of the magnetic recording medium, a given sample is attached fast to a thoroughly washed glass plate of amply high surface accuracy. Then, the pressure of the probe of the detector is increased stepwise and, under a varying probe pressure, the surface roughness of the sample is measured. In this case, the relative positions of the sample under measurement and the probe may be varied when the surface condition of the sample is sufficiently uniform. To ensure accurate comprehension of the viscoelastic deformation of the medium due to the phenomenon of creeping, the relative speed of the sample and the probe is desired to be as low as possible, preferably to be below 10 μm/sec. Though the pressure of the probe is fixed in relation to the shape of the tip of the probe, it is desired to fall in the range in which the deformation of the medium apparently occurs after the pattern of an elastic deformation.

The amount of the deformation to be measured must be fixed below 1/10 of the thickness of the magnetic layer. Generally, the thickness of the magnetic layer is in the range of 2 to 6 μm. The conditions for the measurement of the amount of this deformation, therefore, must be selected so that the amount of the deformation to be measured will be approximately 0.1 μm. These conditions are important because the effect of the substrate, namely the mechanical coupling of the magnetic layer and the substrate grows to a hardly negligible degree when the amount of the deformation is greater than the level mentioned above. In accordance with this method, the deformation of the medium which is balanced against the pressure of the probe increases in proportion as the load for measurement increases. The height at which the curve of measurement indicating the surface falls, therefore, the falls increase in proportion as the load fixed for the measurement. The width of this fall represents the amount of deformation. The deformation ratio is determined by measuring this amount of deformation. When the shape of the tip probe is known, then the area of contact of the tip of the probe on the medium is consequently known, it is possible to measure the deformation of the medium relative to the load per unit area.

When the device for this measurement is of the type marketed under the trademark designation of "Taylor-Hobson Talystep", the probe for measurement has a tip the shape of which has a radius of curvature falling in the range of 2.5 to 100 μm.

When the probe has a tip such that the radius of curvature is 2.5 μm, for example, the first profile of surface quality is obtained with the pressure of the probe varied in the range of 2 to 10 mgf and the relative speed of the probe and the sample in the range of 1 to 400 μm/sec, then the second profile of surface quality is obtained with the pressure of the probe varied in the range of 10 to 50 mgf and the relative speed of the probe and the sample in the range of 0 to 400 μm/sec, and the difference between the heights of these profiles is the amount of deformation.

Then, from the amount of this deformation, the deformation ratio is calculated as follows.

It is assumed that the surface profile level varies from $r_1$ to $r_2$ when the load exerted on the probe held in contact with the sample increases from $w_1$ to $w_2$. Then, the area of contact is expressed by the formula, $2\pi(r_2-r_1)R$ (wherein R stands for effective radius of the probe).

Since the surface pressure (P) is expressed by the formula, $$P = \frac{w_2 - w_1}{2\pi(r_2 - r_1)R},$$

the deformation ratio per unit area per unit load is found as follows:

$$\text{Deformation ratio} = \frac{(r_2 - r_1)}{P}$$

$$= \frac{2\pi(r_2 - r_1)^2 R}{w_2 - w_1}$$

The deformation ratio in this invention has little dependency on the thickness and material of the substrate and can be equally applied to magnetic layers of varying magnetic recording media ranging from tapes to discs.

Examples of the substrate which is used effectively in the present invention include flexible substrates formed of films of polyethylene terephthalate and polyolefin sulfide and rigid substrates of aluminum.

As examples of the ferromagnetic powder suitable for use in the present invention, hexagonal ferrites represented by the general formula, $MO \cdot n(Fe_2O_3)$ (wherein M stands for one element selected from among Ba, Sr, Pb and Ca, and n for a number in the range of 5 to 6, providing that part of the Fe may be substituted with a metal such as Ti, Co, Zn, In, Mn, Cu, Ge, Nb, Zr, V, Al, or Sn), and possessing a coercive force in the range of 200 to 2,000 Oe may be cited.

As the resinous binder to be used in this invention, any one or the same combination of the flexible film-forming material possessing affinity for the material for the substrate and the magnetic powder can be used. As concrete example of such materials, such well-known materials as vinyl chloride-vinyl acetate type copolymer materials, NBR-polyvinyl acetate type materials, urethane-plasticized vinyl chloride-vinyl acetate type copolymer materials, polyurethane type materials, polyester type resins, and isocyanate type materials can be cited.

These resinous binder materials can be used either singly or in the form of a mixture of two or more members. The resinous binder is desired to be incorporated in an amount in the range of 2 to 30 parts by weight, based on 100 parts by weight of the fine ferromagnetic particles.

This range is fixed for the following reason. If the amount of the resinous binder is less than 2 parts by weight, the degree of dispersion of the fine ferromagnetic particles is lowered and the stability of the produced magnetic coating material during the dilution with a solvent or the orientation of magnetic field is possibly degraded. Conversely if the amount of the resinous binder exceeds 30 parts by weight, the produced magnetic recording medium possibly fails to acquire necessary magnetic properties. Further, the resinous binder is desired to be such that the deformation ratio of the produced magnetic recording medium will fall below $1 \times 10^{-2}$ μm$^3$/mgf, preferably in the range of $1 \times 10^{-2}$ to $1 \times 10^{-6}$ μm$^3$/mgf.

The limits of the deformation ratio are fixed for the following reason. If the deformation ratio exceeds $1 \times 10^{-2}$ μm$^3$/mgf, the curing property is degraded and the produced magnetic recording medium possibly fails to acquire stable durability.

The amount of the curing agent to be used in the present invention is desired to be in the range of 2 to 50 parts by weight, based on 100 parts by weight of the aforementioned resin. If this amount is less than 2 parts by weight, the reaction for bonding resinous binder molecules to a three-dimensional reticular structure each other does not proceed sufficiently. If the amount exceeds 50 parts by weight, the excess curing agent which does not participate in the reaction with the resinous binder reacts with itself and the product of this reaction finds its into the reticular structure of the resinous binder and degrades the strength of the coating.

The magnetic recording medium of this invention is produced, for example, as follows. First, in a dispersing and mixing machine such as a sand grinder pot, the hexagonal ferromagnetic powder, the resinous binder, and a suitable solvent are placed in suitable amounts and are mixed by setting the machine operating, to the kind of prepare a magnetic coating material.

In this case, by adjusting the mixing ratio of the magnetic powder and the resinous binder and selecting the resinous binder, for example, the deformation ratio of the magnetic media is caused to fail below $1 \times 10^{-2}$ $\mu m^3/mgf$.

Generally, the relation between the deformation ratio and the film composition can be adjusted by varying the mixing ratio of the pigment such as the magnetic powder to the resinous binder. Further, by selecting the resinous binder by sufficiency of rigidity or by controlling the amount of the curing agent to be added, the cross-link density of the resinous binder can be heightened and the deformation ratio decreased. The resinous binder of high rigidity under discussion is a resinous binder of the type such that when a film of this resinous binder is tested by the method described above, the amount of deformation is small.

The magnetic coating material, when necessary, may further incorporate therein various known additives such as antistatic conductor like carbon black, dispersant like lecithin, lubricant, abradant, and stabilizer. Then, magnetic coating material consequently obtained is applied by the conventional method using a reverse roll coater, a doctor blade coater, or a gravurecoater. The applied layer of this coating material is dried and subjected to a smoothening treatment, to produce the magnetic recording medium of this invention. The surface of the magnetic recording medium is desired to have a roughness (Ra) in the range of 0.003 to 0.1 $\mu m$. If the surface roughness exceeds 0.1 $\mu m$, the produced magnetic medium acquires a capacity for high density recording with difficulty. Conversely if the surface roughness is less than 0.003 $\mu m$, the runnability of the produced magnetic medium is unstable from the beginning.

When the smoothening treatment is carried out with a calender, the deformation ratio can be varied by the conditions of the calendering operation. Generally, the deformation ratio is decreased by exacting such conditions as pressure and temperature.

The mechanism which underlies the improvement of the traveling stability and the stabilization of durability in the magnetic recording medium of the present invention is not perfectly clear. Since the magnetic recording medium of this invention, for a fixed frictional force, exhibits a smaller amount of deformation and a smaller sliding surface change during the sliding than the conventional magnetic recording medium, it is inferred that this magnetic recording medium retains a high surface accuracy, maintains the runnability stably irrespectively of the number of passes of sliding even from the initial stage of operation, and consequently attains stabilization of the runnability and durability.

DETAILED DESCRIPTION OF THE PREFERRED EMBODIMENTS

Now, the present invention will be described more specifically below with reference to working examples.

EXAMPLE 1

A magnetic coating material was prepared by the conventional method, using the following components in the proportions indicated correspondingly.

| | |
|---|---|
| Ba-ferrite powder (Co—Ti substituted grade, having an average particle diameter of 0.08 $\mu m$) | 100 parts by weight |
| Carbon black | 3 parts by weight |
| $Cr_2O_3$ (abradant) | 3 parts by weight |
| Fluorocarbon (lubricant) | 6 parts by weight |
| Polyurethane resin (resinous binder) | 25 parts by weight |
| Polyisocyanate (product of Nippon Urethane Co., Ltd. and marketed under trademark designation of "Coronate L") | 10 parts by weight |

With a blade coater, this magnetic coating material was applied to both sides of a polyester film (substrate) 75 $\mu m$. in thickness. The applied layers of the magnetic coating material were dried. Then, the coated sample was given a calendering treatment at 80° C. to smoothen the surfaces of the magnetic layers. Discs 3.5 inches in diameter were punched out of the magnetic recording medium. Part of the discs were set in jackets. The magnetic layers in these discs had a thickness of 3 $\mu m$.

Then, a portion of a given disc was cut off, applied fast to a thoroughly washed glass plate of high surface quality, and subsequently tested for deformation by the following method. The measurement of the deformation was carried out with an instrument marketed under trademark designation of "Taylor-Hobson Talystep" using a probe with a diamond tip of which had a radius of curvature of 2.5 $\mu m$.

First, a profile indicating surface quality of the sample was obtained under a probe pressure of 2 mgf at a probe sample relative speed of 2.5 $\mu m/sec$. Then, with the sample held in the same state, the probe was returned to the original position and another surface profile was obtained under a probe pressure of 45 mgf. In this measurement, the difference in height between the surface profiles under probe pressures 2 mgf and 45 mgf, namely the deformation of the magnetic layer due to an increased load of 43 mgf, was 0.02 $\mu m$.

Incidentally, a coating formed solely of the same resinous binder incorporating therein 10 parts by weight of "Coronate L" and then cured was found, by the same test, to exhibit a deformation ratio of $3 \times 10^{-2}$ $\mu m^3/mgf$.

Since the contact area was approximately $2\pi(r_2-r_1) \cdot R$, the deformation ratio per unit area per unit load is found by calculation to have been $$2\pi (r_2 - r_1)^2 \cdot R/(w_2 - w_1) =$$
$$2\pi \times 0.02^2 \times 2.5/43 = 1 \times 10^{-4} \, \mu m^3/mgf.$$

The surface roughness (Ra) of the magnetic layer of the disc calculated from the profile under the probe pressure 2 mgf was 0.1 μm.

EXAMPLE 2

A magnetic coating material was prepared by the conventional method using the following components in the amounts indicated correspondingly.

| | |
|---|---|
| Ba-ferrite powder (Co—Ti substituted grade, having an average particle diameter of 0.08 μm) | 100 parts by weight |
| Carbon black (antistatic agent) | 6 parts by weight |
| Cr₂O₃ (abradant) | 3 parts by weight |
| Fluorocarbon (lubricant) | 6 parts by weight |
| Polyurethane resin (resinous binder) | 25 parts by weight |
| Polyisocyanate (product of Nippon Urethane Co., Ltd. and marketed under trademark designation of "Coronate L") | 2 parts by weight |

Discs of magnetic recording medium 3.5 inches in diameter were prepared by following the procedure of Example 1. Part of these discs were set in jackets.

The magnetic layers of the magnetic recording medium were found to have a thickness of 3 μm and a surface roughness of 0.1 μm. The magnetic recording medium was found to have a deformation ratio of $1 \times 10^{-2}$ μm³/mgf. A coating obtained solely of the same resinous binder incorporating 10 parts by weight of Coronate and subsequently curing the applied layer was found to exhibit a deformation ratio of $5 \times 10^{-2}$ μm³/mgf.

EXAMPLE 3

Discs of magnetic recording medium 3.5 inches in diameter were prepared by the same procedure of Example 1, excepting the calendering treatment was performed twice. Part of the discs were set in jackets.

The magnetic recording medium was found to have a deformation ratio of $4 \times 10^{-5}$ μm³/mgf and a surface roughness of 0.003 μm.

EXAMPLE 4

Discs of magnetic recording medium 3.5 inches in diameter were prepared by following the procedure of Example 3, excepting the magnetic coating material obtained in Example 2 was used instead. Part of the discs were set in jackets.

The magnetic recording medium had a magnetic layer thickness of 3 μm, a deformation ratio of $1 \times 10^{-3}$ μm³/mgf, and a surface roughness of 0.003 μm.

COMPARATIVE EXPERIMENT 1

A magnetic coating material was prepared by the conventional method using the following components in the amounts indicated correspondingly.

| | |
|---|---|
| Ba-ferrite powder (Co—Ti substituted grade, having an average particle diameter of 0.08 μm) | 100 parts by weight |
| Carbon black (antistatic agent) | 6 parts by weight |
| Cr₂O₃ (abradant) | 3 parts by weight |
| Fluorocarbon (lubricant) | 0.8 part by weight |
| Polyurethane resin (resinous binder) | 25 parts by weight |
| Polyisocyanate (product of Nippon Urethane Co., Ltd. and marketed under trademark designation of "Coronate L") | 0.25 Part by weight |

Discs magnetic recording medium 3.5 inches in diameter having magnetic layers 3 μm in thickness were produced by following the procedure of Example 1. Part of the discs were set in jackets.

COMPARATIVE EXPERIMENT 2

Discs of magnetic recording medium 3.5 inches in diameter possessing magnetic layers 3 μm in thickness were produced by following the procedure of Example 3, excepting the magnetic coating material of Comparative Experiment 1 was used instead. Part of the discs were set in jackets.

COMPARATIVE EXPERIMENT 3

Discs of magnetic recording medium 3.5 inches in diameter possessing magnetic layers 3 μm in thickness were produced by following the procedure of Example 1, excepting the magnetic coating material of Comparative Experiment 1 was used instead and calendering treatment was performed three times. Part of the discs were set in jackets.

COMPARATIVE EXPERIMENT 4

Discs of magnetic recording medium 3.5 inches in diameter possessing magnetic layers 3 μm in thickness were produced by following the procedure of Example 1, excepting the magnetic coating material of Comparative Experiment 2 was used instead and the calendering treatment was performed three times. Part of the discs were set in jackets.

COMPARATIVE EXPERIMENT 5

Discs of magnetic recording medium possessing magnetic layers 3 μm in thickness were produced by following the procedure of Example 1, excepting the surface smoothening treatment was carried out one-half degree. Part of the discs were set in jackets.

The properties of the magnetic recording media obtained in the working example and the comparative experiments are shown in the following table.

TABLE

| | Example | | | | Comparative Experiment | | | | |
|---|---|---|---|---|---|---|---|---|---|
| | 1 | 2 | 3 | 4 | 1 | 2 | 3 | 4 | 5 |
| Deformation ratio (μm²/mgf) | $1 \times 10^{-4}$ | $1 \times 10^{-2}$ | $4 \times 10^{-5}$ | $1 \times 10^{-2}$ | $1.3 \times 10^{-2}$ | $1.2 \times 10^{-2}$ | $7 \times 10^{-3}$ | $8 \times 10^{-3}$ | $1.2 \times 10^{-2}$ |
| Surface roughness, Ra (um) | 0.1 | 0.1 | 0.003 | 0.003 | 0.1 | 0.003 | 0.001 | 0.002 | 0.12 |
| Output (*1) | 0 | 0 | +1.5 | +1.3 | 0 | +1.5 | +1.8 | +1.7 | −0.8 |
| D50 (bpi) | 53 | 53 | 59 | 59 | 52 | 59 | 60 | 60 | 48 |
| Dynamic frictional coefficient (*2) | 0.19 | 0.25 | 0.20 | 0.25 | 0.32 | 0.33 | 0.41 | 0.42 | 0.3 |

TABLE-continued

| | Example | | | | Comparative Experiment | | | | |
|---|---|---|---|---|---|---|---|---|---|
| | 1 | 2 | 3 | 4 | 1 | 2 | 3 | 4 | 5 |
| Durability (× million passes) (*3) | >10 | >10 | >10 | >10 | 5 | 3 | 1 | 1 | >1 |

(*1) Relative value based on the value of Example 1; conditions of measurement 40 KFRI and 0.33 um in head gap.
(*2) Calculated from motor load current obtained by double-face head drive under the conditions of 20 gf of head load and 300 rpm of rotational speed.
(*3) In a continuous double-face head drive around the periphery of a given 3.5-inch disc medium, the number of passes made by the time the fall of replay output from the initial value totalled 1 dB was reported as durability.

What is claimed is:

1. A magnetic recording medium comprising a nonmagnetic substrate and a magnetic layer formed thereon, said magnetic layer consisting essentially of a ferromagnetic powder and a resinous binder in an amount in the range of 2 to 30 parts by weight based on 100 parts of said ferromagnetic powder, said magnetic layer having a deformation ratio in the direction perpendicular to the film surface of the magnetic layer of not more than $1 \times 10^{-2} \mu m^3/mgf$ and a surface roughness in the range of 0.003 to 0.1 $\mu m$.

2. The magnetic recording medium according to claim 1, wherein the magnetic layer has a thickness in the range of 0.5 to 3 $\mu m$.

3. The magnetic recording medium according to claim 1, wherein said ferromagnetic powder is a hexagonal ferrite represented by the general formula:

$$MO \cdot n(Fe_2O_3)$$

(wherein M stands for one element selected from among Ba, Sr, Pb and Ca, and n stands for a number in the range of 5 to 6, providing that part of the Fe may be substituted with a metal such as Ti, Co, Zn, In, Mn, Cu, Ge, Nb, Zr, V, Al, or Sn) and possessing a coercive force in the range of 200 to 2,000 Oe.

4. The magnetic recording medium according to claim 1, 2 or 3, wherein said resinous binder comprises a polyurethane resin and a curing agent.

5. The magnetic recording medium according to claim 4, wherein said curing agent is contained in an amount in the range of 2 to 50 parts by weight based on 100 parts by weight of said resinous binder.

6. The magnetic recording medium according to claim 4, wherein said magnetic layer incorporates at least one additive selected from the group consisting of antistatic conductor, dispersant, lubricant, abradant, and stabilizer.

7. The magnetic recording medium according to claim 1, wherein said deformation ratio in the direction perpendicular to the film surface from the magnetic layer side is in the range of $1 \times 10^{-2}$ to $1 \times 10^{-6}$ $\mu m^3/mgf$.

* * * * *